(12) United States Patent
Yagisawa

(10) Patent No.: US 7,455,052 B2
(45) Date of Patent: Nov. 25, 2008

(54) FUEL SUPPLY DEVICE

(75) Inventor: Katsuichi Yagisawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 7 days.

(21) Appl. No.: 11/007,342

(22) Filed: Dec. 9, 2004

(65) Prior Publication Data
US 2005/0126546 A1 Jun. 16, 2005

(30) Foreign Application Priority Data
Dec. 12, 2003 (JP) .............................. 2003-414847

(51) Int. Cl.
*F02M 37/04* (2006.01)
*F02M 37/08* (2006.01)
(52) U.S. Cl. .................................... 123/509
(58) Field of Classification Search ................. 123/509, 123/514, 495, 510; 180/219, 69.4, 225; 137/565.34, 137/574, 565.17
See application file for complete search history.

(56) References Cited

U.S. PATENT DOCUMENTS

| | | | | |
|---|---|---|---|---|
| 4,354,469 A * | 10/1982 | Sato | .......................... | 123/460 |
| 4,871,041 A * | 10/1989 | Saito et al. | .................. | 180/219 |
| 5,613,476 A * | 3/1997 | Oi et al. | ....................... | 123/509 |
| 5,782,223 A * | 7/1998 | Yamashita et al. | .......... | 123/510 |
| 6,142,126 A * | 11/2000 | Kanamaru | .................. | 123/509 |
| 6,401,750 B2 * | 6/2002 | Tokunaga | ............... | 137/565.34 |
| 6,609,503 B1 * | 8/2003 | Nakagawa et al. | .......... | 123/509 |
| 6,655,363 B2 * | 12/2003 | Kobayashi et al. | .......... | 123/509 |
| 6,675,778 B1 * | 1/2004 | Kemper et al. | ............... | 123/516 |
| 6,719,539 B1 * | 4/2004 | Yoshioka | ..................... | 417/363 |
| 6,907,865 B1 * | 6/2005 | Hanby | ......................... | 123/509 |
| 6,932,177 B2 * | 8/2005 | Hara et al. | ................... | 180/219 |
| 7,089,917 B1 * | 8/2006 | McKinster et al. | .......... | 123/509 |
| 2002/0033168 A1 * | 3/2002 | Noda | .......................... | 123/509 |
| 2002/0038653 A1 * | 4/2002 | Kobayashi et al. | .......... | 123/509 |
| 2002/0185180 A1 * | 12/2002 | Smith et al. | ............. | 137/565.17 |

FOREIGN PATENT DOCUMENTS

JP 11-93794 A 4/1999
JP 2002-106440 A 4/2002

* cited by examiner

*Primary Examiner*—Mahmoud Gimie
(74) *Attorney, Agent, or Firm*—Birch, Stewart, Kolasch & Birch, LLP

(57) ABSTRACT

To incorporate a fuel pump inside a fuel tank having a complicated shape with a small width. A motorcycle may be an offroad model with a fuel tank having a complicated shape with a small width. The fuel pump includes a base plate which is fixed to a plate fitted on the upper surface of the fuel tank. A cylindrical and elongated pump body extends downwardly from the base plate. An intake pipe having a filter formed on the distal end thereof is connected to the pump body. The base plate of the fuel pump and a hose joint arranged on the upper surface of the base plate are covered by the front portion of the rider's seat. The upper portion of the fuel pump is exposed to the outside of the fuel tank. Thus, it is possible to easily have access to the fuel pump when performing the maintenance.

12 Claims, 9 Drawing Sheets

FUEL SUPPLY DEVICE

CROSS-REFERENCE TO RELATED APPLICATIONS

The present application is related to Japanese Patent Application No. 2003-414847 filed on Dec. 12, 2003 the entire contents of which are hereby incorporated by reference.

BACKGROUND OF THE INVENTION

1. Field of the Invention

The present invention relates to a fuel supply device, and more particularly to a fuel supply device for a vehicle wherein a fuel pump is positioned inside a fuel tank which is small and has a small width.

2. Description of Background Art

In mounting a fuel pump inside a fuel tank, the fuel pump is often mounted on the bottom plate side of the fuel tank. For example, JP-A-11-93794 discloses a fuel supply device for a vehicle wherein a base plate of a fuel pump is fixed to a flattened portion formed on the rear end portion of a bottom plate of a fuel tank. Further, JP-A-2002-106440 discloses a fuel supply device for a vehicle wherein a fuel pump is provided inside a fuel tank with the fuel pump being astride with a body frame in a state wherein the fuel pump faces the vehicle frame in an opposed manner.

The above-mentioned arrangement of the fuel pump in the conventional fuel supply device is permitted when the bottom plate of the fuel tank has a flat surface on which the fuel pump can be mounted or when the fuel supply device is used with a large-sized vehicle in which the capacity of a fuel tank per se is large. However, with respect to a motorcycle of an offroad model or a racing model, it is often the case that the capacity of the fuel tank is small or it is difficult to form a flat surface on the bottom plate. Accordingly, in such a vehicle, it is difficult to mount the fuel pump on the bottom plate side of the fuel tank. Hence, there is a demand for a fuel supply device which allows the fuel pump to be mounted inside the fuel tank of a motorcycle of an offroad model or a racing model.

SUMMARY AND OBJECTS OF THE INVENTION

It is an object of the present invention to provide a fuel supply device which can mount a fuel pump inside a fuel tank with a bottom portion that has a complicated shape or a fuel tank that has a small capacity.

To achieve the above-mentioned object, a first feature of the present invention provides a fuel supply device including a fuel pump which is disposed inside a fuel tank which is located in front of a rider's seat for a vehicle. The fuel pump includes a base plate which is connected to the upper surface of the fuel tank and on which a fuel discharge joint and a power supply connector are formed, a pump body is formed on the lower surface of the base plate, and a fuel intake portion is arranged below the pump body and is directed to the bottom portion of the fuel tank. The base plate is arranged at a position which is covered by the front portion of the rider's seat of the vehicle.

Further, a second feature of the present invention lies in that the vehicle is an offroad vehicle. A third feature of the present invention lies in that a cover member covers the fuel pump and is provided between the seat and the fuel pump.

Further, a fourth feature of the present invention lies in that the pump body is formed in a cylindrical shape and is provided with a check valve and a pressure regulating valve which are arranged on the extension of a cross-sectional plane of the pump body between the pump body and the base plate.

Still further, a fifth feature of the present invention lies in that the fuel tank has, to allow the fuel tank to be arranged astride a frame member which extends in the fore-and-aft direction of the vehicle with a lower surface thereof formed into a recessed shape directed to the inside of the fuel tank.

According to the present invention having the first feature, since the fuel pump is arranged inside the fuel tank in a downwardly suspended manner from the upper surface of the fuel tank, it is possible to easily mount the fuel pump inside the fuel tank even when the width thereof is small and the bottom portion thereof has a complicated shape. Further, although the discharge joint of the fuel and the power supply connector which are positioned on the upper surface of the fuel tank are covered by the rider's seat, these portions are provided to an appearance portion which is exposed from the fuel tank. Thus, the maintenance of these portions is facilitated.

With respect to an offroad vehicle, in general, the width of the fuel tank is small and the shape thereof is complicated. Thus, by applying the present invention to the offroad vehicle having such a fuel tank, it is possible to easily perform the fuel pump mounting operation.

According to the third feature, even when the rider moves to the front portion of the seat, the upper portion of the fuel pump is protected by a cover.

According to the fourth feature, the fuel pump has an elongated shape and has no portion which projects from an outer diameter of a pump body. Thus, it is possible to easily incorporate the fuel pump inside the fuel tank having a small width and a complicated shape.

According to the fifth feature, by adopting the constitution that the frame extends in the fore-and-aft direction of the vehicle with the fuel tank extending longitudinally, even when the shape of the fuel tank is complicated, it is possible to arrange the elongated fuel pump in a state wherein the fuel pump is suspended from the upper portion of the fuel tank.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 5:
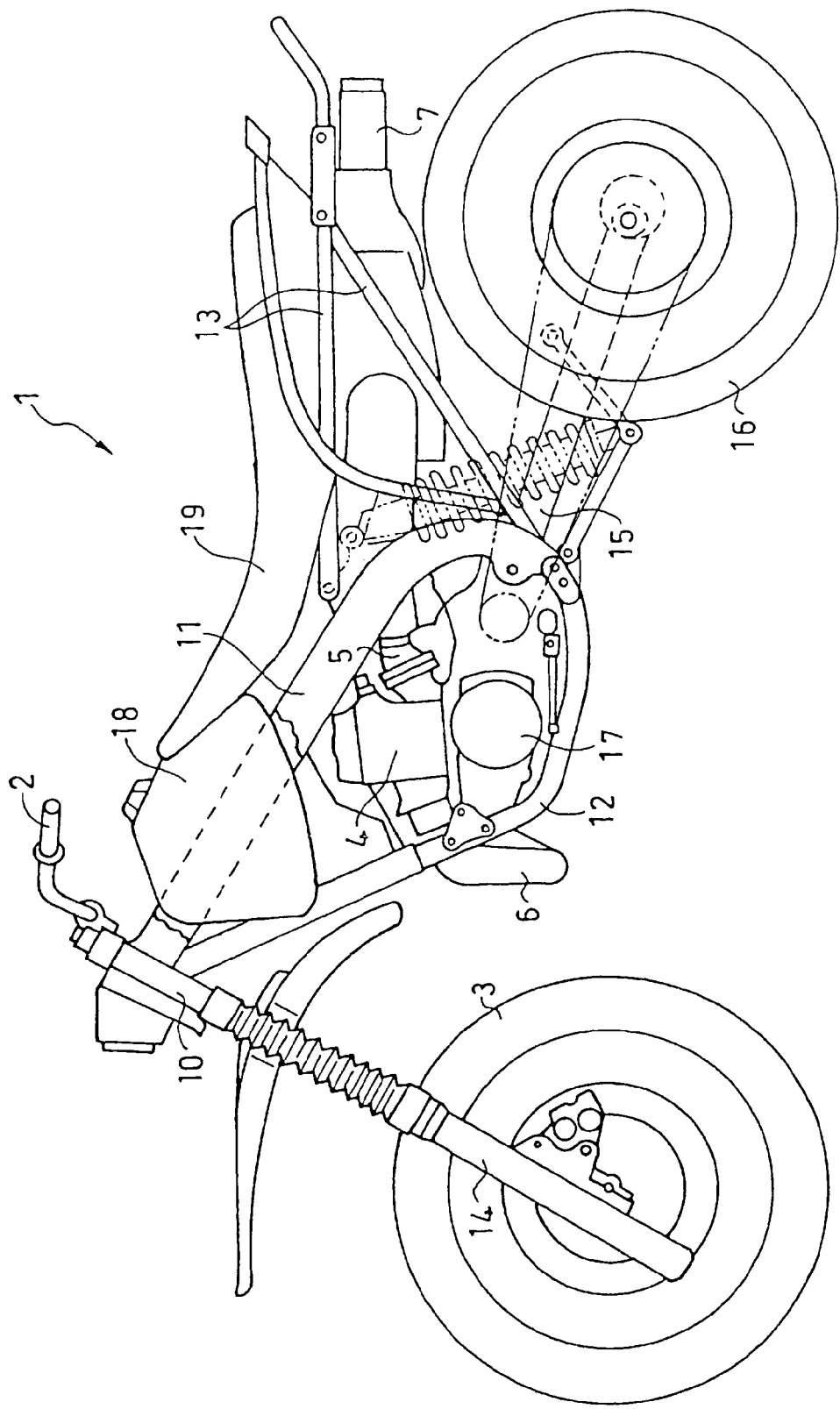
FIG. 5 is a side view of a motorcycle having the fuel supply device according to one embodiment of the present invention.

One embodiment of the present invention is explained hereinafter in conjunction with drawings. FIG. 5 is a side view of a motorcycle of an offroad model having a fuel supply device according to one embodiment of the present invention. Here, in the embodiment explained hereinafter, the explanation is made with respect to an example in which the present invention is applied to the motorcycle of an offroad model. In this embodiment, the offroad model or the offroad vehicle is not limited to a two-wheeled vehicle but can include a two-wheeled vehicle, a three-wheeled vehicle or a four-wheeled vehicle which travels on an uneven ground and a so-called buggy vehicle.

In FIG. 5, the motorcycle 1 is provided with a vehicle body frame which includes a head pipe 10 which is positioned at the front portion of the vehicle body, main frames 11 which extend rearwardly and downwardly from the head pipe 10, and a lower frame 12 which has a front end thereof connected to lower ends of the main frames 11 and extends rearwardly. A rear portion of the lower frame 12 is further raised to form a rear frame 13.

A handle 2 is mounted on the upper portion of the head pipe 10. A front wheel 3 is supported on a front fork 14 which extends downwardly from the head pipe 10. An engine 4 is mounted between the main frames 11 and the lower frame 12. An intake pipe 5 and an exhaust pipe 6 are connected to the engine 4, while the exhaust pipe 6 is connected to a muffler 7 which is arranged at a rear portion of the vehicle body. A rear wheel 16 is supported on a stay 15 which extends rearwardly from the vehicle body frame. Power is transmitted to the rear wheel 16 from the engine 4 by way of a transmission 17 and a clutch.

Figure 1:
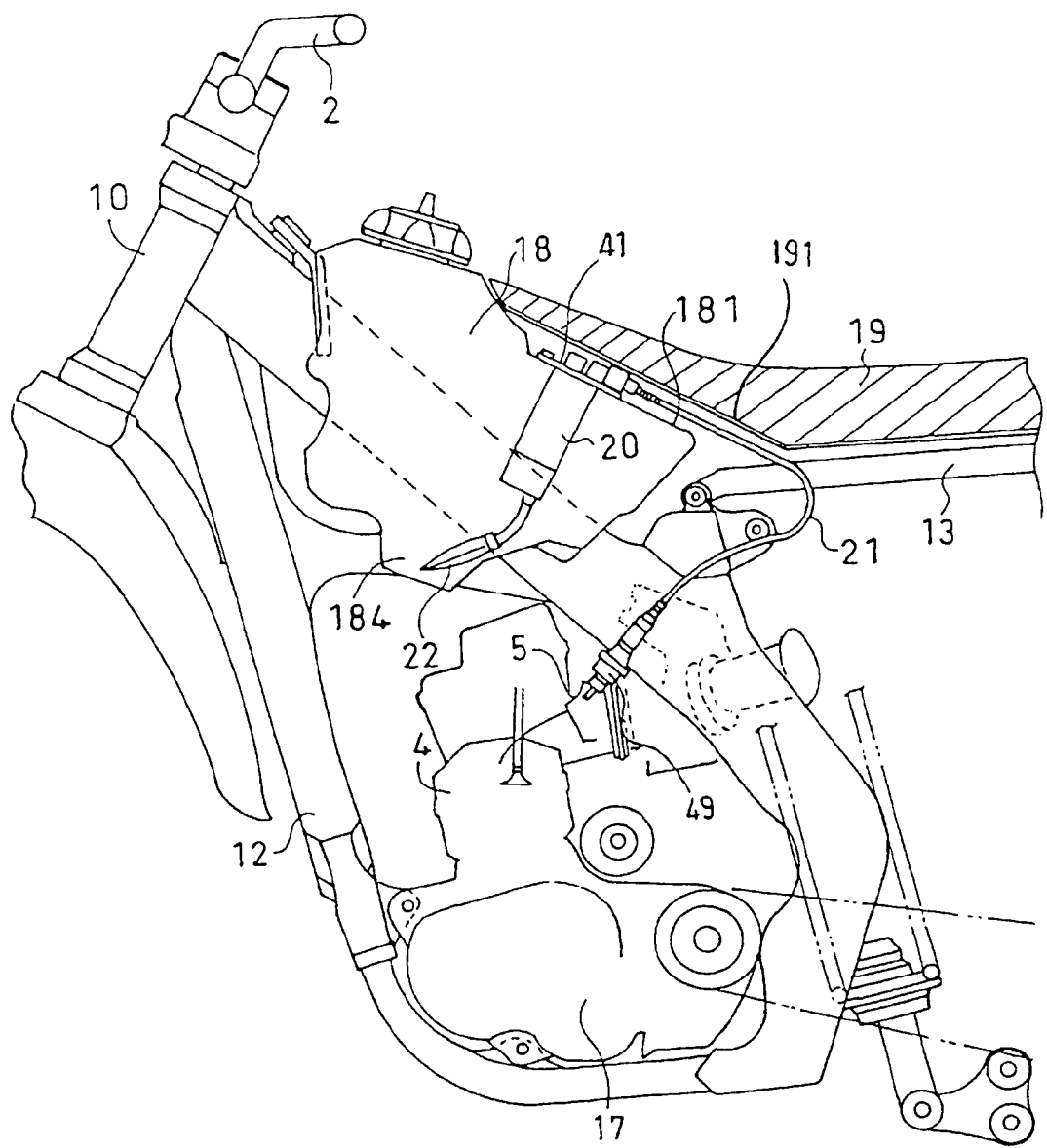
FIG. 1 is an enlarged view of an essential part of a motorcycle having a fuel supply device according to one embodiment of the present invention.
Figure 2:
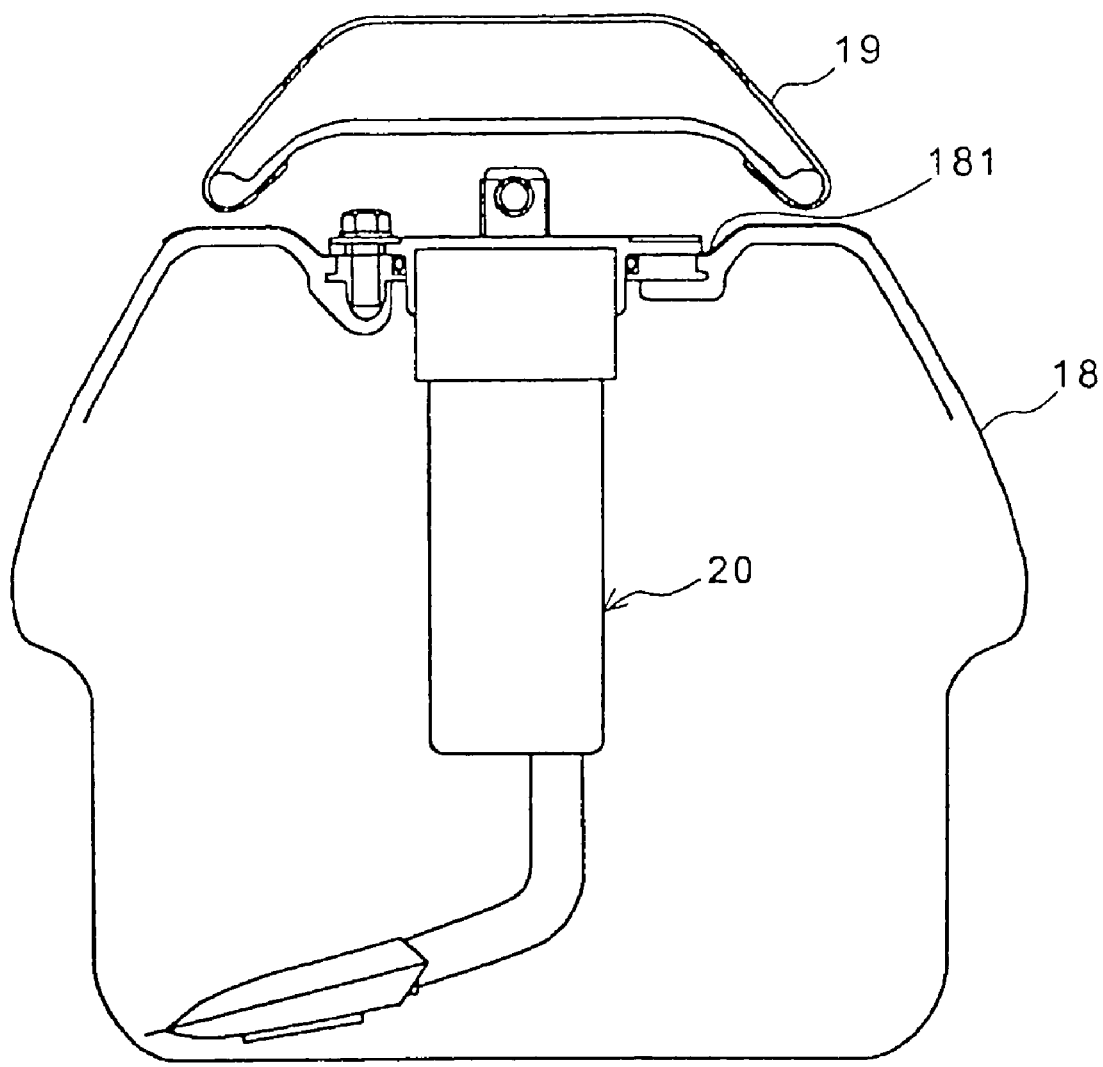
FIG. 2 is a transverse cross-sectional view of a fuel tank on which the fuel supply device according to one embodiment of the present invention is mounted.
Figure 3:
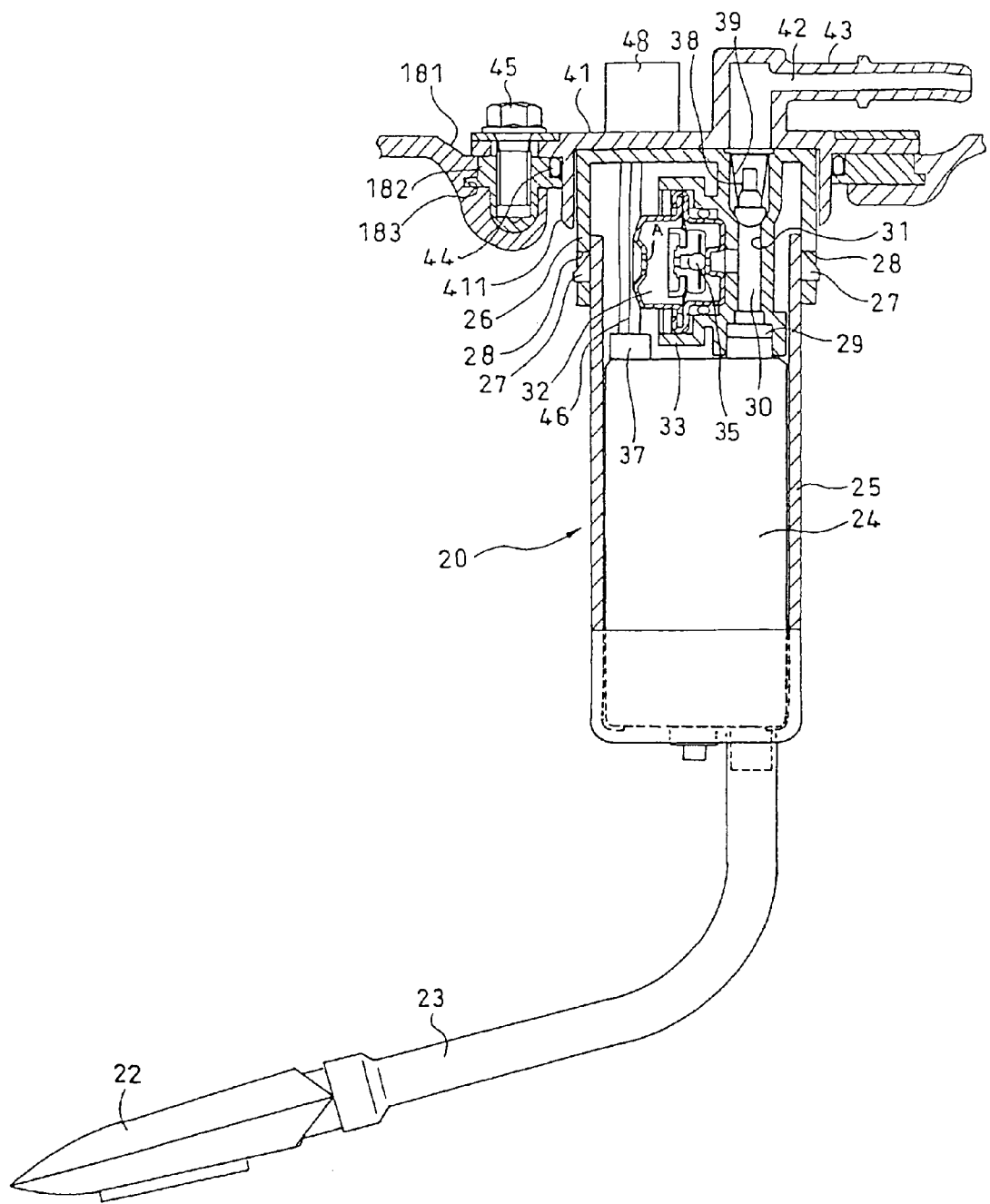
FIG. 3 is a cross-sectional view of a fuel pump inside the fuel tank.
Figure 4:
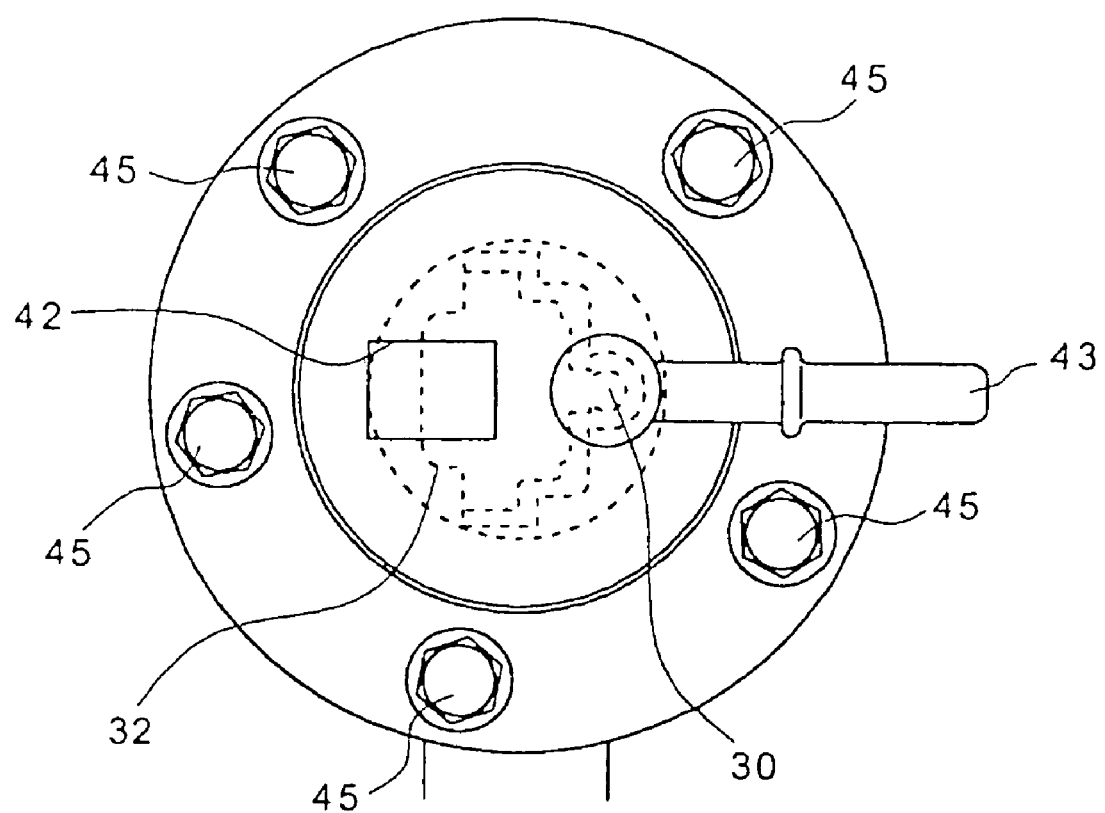
FIG. 4 is a top plan view of the fuel pump shown in FIG. 3.

Although the front portions of the above-mentioned main frames 11 are connected to the head pipe 10, the rear portions of the main frames 11 are bifurcated in the vehicle width direction. Further, a fuel tank 18 is provided in a state wherein the fuel tank 18 is positioned between the main frames 11 and above the engine 4. The rider's seat 19 which extends rearwardly in a state wherein the rider's seat 19 covers a portion of a rear portion of the fuel tank 18 is supported on the rear frame 13 in a lying state. The seat 19 includes a lock which is engaged with the frame of the vehicle body and a hinge which is connected to the frame of the vehicle body (both of them not shown in the drawing), wherein when the seat 19 is opened upwardly about the hinge by unlocking the lock, the rider can have the access to the upper portion of a fuel pump 20, see FIG. 1.

In FIGS. 1-4, the upper surface 181 of the fuel tank 18 is formed into a flat surface, and a fuel pump 20 is provided in a state wherein the fuel pump 20 is fixed to the surface 181 and extends toward the bottom portion of the fuel tank 18. To the upper surface 181 of the fuel tank 18, an annular plate 182 for mounting the fuel pump 20 is fixed. An outer peripheral portion of the plate 182 is fitted into a dovetail groove 183 which is an opening formed in the upper surface 181 of the fuel tank 18 and is integrally constituted with the fuel tank 18. The fuel pump 20 is fixed by fastening a base plate 41 which is positioned above the fuel pump 20 to the above-mentioned plate 182 using a plurality of bolts 45.

From the upper portion of the fuel pump 20, a hose joint 43 connects a fuel hose 21 for supplying fuel discharged from a pump body to a fuel injection valve. A connector 48 is provided for pulling electric lines for the fuel pump 20 and the like. These parts are covered with the seat 19. The seat 19 includes, as a cover member which is overlapped to at least above the fuel tank 18, a bottom plate 191 which is made of a member less deformable than a body of the seat 19, a member having a surface on which the rider sits.

The fuel pump 20 is of an elongated cylindrical type which arranges a pressure regulating valve 32 and a check valve 38 therein in a state wherein the pressure regulating valve 32 and the check valve 38 do not project from an outer diameter of the pump body. Since the fuel pump 20 is arranged vertically and is mounted on the fuel tank 18, it is unnecessary to increase the mounting surface with respect to the fuel tank 18. Accordingly, the fuel pump 20 is suitable for a vehicle such as an offroad model motorcycle which includes the fuel tank 18 that has a small vehicle-width directional size.

To the bottom portion of the fuel pump 20, an intake pipe 23 for fuel having a filter 22 is connected. A fuel hose 21 is pulled out to the outside from the upper portion of the fuel pump 20 and is connected to a fuel injection valve 49 mounted on the intake pipe 5 of the engine 4.

The bottom surface of the fuel tank 18 projects downwardly and forms a recessed portion 184 which is suitable for the accumulation of fuel as viewed from an inner surface thereof. The fuel pump 20 is arranged so that the filter 22 is positioned inside the recessed portion 184. Accordingly, even when the fuel inside the fuel tank 18 becomes small, the fuel tank 18 can suck the fuel accumulated in the recessed portion 184. That is, the fuel tank is configured such that even when the motorcycle for racing or the like has such a complicated tank shape and the remaining fuel becomes small, the motorcycle can continue the traveling as long as possible.

In this embodiment, since the fuel pump 20 is configured to be mounted on the upper surface of the fuel tank 18, it is possible to preferably use the fuel tank 18 having such a complicated bottom-surface shape.

A motor 24 which constitutes a pump body of the fuel pump 20 is housed in a space defined by a cylindrical housing 25 having a cap 26. The fuel pump 20 is a Wasco type pump which includes an impeller (not shown in the drawing) in a lower portion, that is, at a position close to the bottom portion of the fuel tank 18. The cap 26 is fitted on an outer periphery of the housing 25 and the cap 26 and the housing 25 are connected with each other due to the engagement between pawl members 27 formed on the housing 25 side and holes 28 formed in the cap 26 side. The cap 26 includes a wall 31 which forms a discharge passage 30 which is, in turn, fitted on a fuel outlet 29 mounted on the upper portion of the motor 24 in a projecting manner. An annular wall 33 is formed in the middle portion of the wall 31 for holding a pressure regulating valve 32. The pressure regulating valve 32 includes a spherical valve element 35 which is supported on a diaphragm, wherein the valve element 35 closes a hole communicated with the discharge passage 30 at a given pressure. When the fuel pressure inside the discharge passage 30 exceeds the given pressure, the spherical valve element 35 is retracted and hence, the fuel is leaked into the inside of the pressure regulating valve 32 whereby the pressure inside the discharge passage 30 is maintained at the given value. The fuel which flows into the inside of the pressure regulating valve 32 is discharged to the vicinity of the pawl members 27 of the housing 25 from a discharge port A of the pressure regulating valve 32 and is returned to the inside of the fuel tank 18 through an opening not shown in the drawing which is formed in the housing 25.

A check valve 38 is mounted on an upper portion of the discharge passage 30. The check valve 38 is biased downwardly by a spring 39. Accordingly, when the fuel attempts to flow backwardly, that is, when the fuel attempts to flow into the pump 20, the check valve 38 closes the discharge passage 30 to prevent the backflow.

The base plate 41 includes a hose joint 43 having a passage 42 which is communicated with the discharge passage 30. A lower surface of the base plate 41 and an upper surface of the cap 26 are connected to each other by adhesion, melting or the like. Further, a connector 48 for the electric lines is formed on the base plate 41. An electric line 46 extends from the connector 48 and is connected to the motor 24 through a receiving portion 37 of the electric lines 46.

The base plate 41 includes a skirt 411 which extends downwardly and a gap is formed between an outer periphery of the skirt 411 and an inner periphery of a plate 182 which is fitted in an opening formed on the upper surface of the fuel tank 18 that is liquid-hermetically sealed by a sealing member 44.

In this manner, since the pressure regulating valve 32 and the check valve 38 are arranged in a state wherein these parts are accommodated inside a cylinder which is extended along the outer diameter of the motor 24, it is possible to reduce the size of the base plate 41, that is, the planar area can be reduced. Accordingly, it is possible to mount the base plate 41 without any trouble on the upper surface of the fuel tank 18 which is narrow in the vehicle-width direction.

Figure 6:
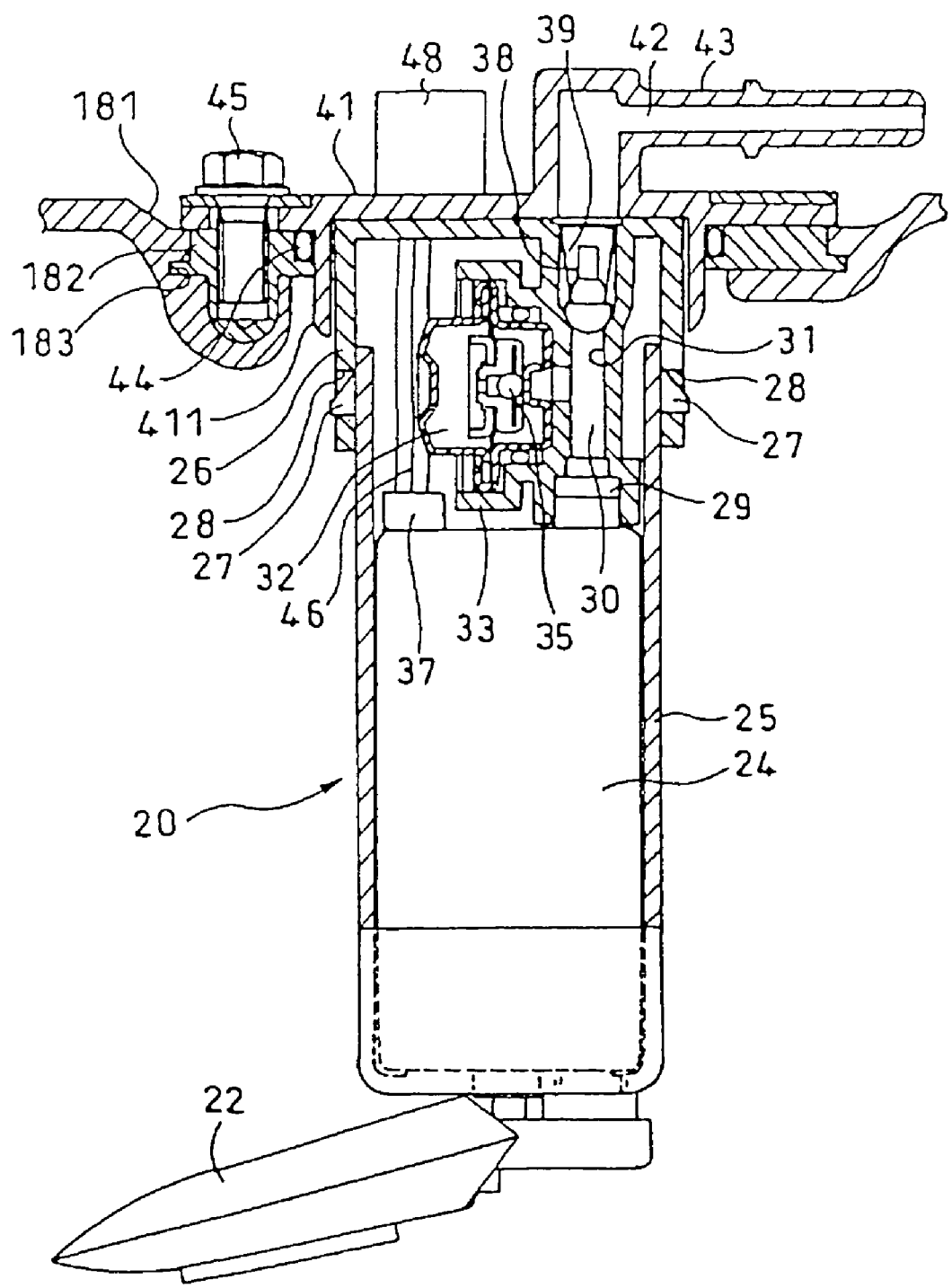
FIG. 6 is a cross-sectional view of a fuel pump according to a modification.

With respect to the above-explained pump 20, the filter 22 is mounted on the pump 20 by way of the intake pipe 23. However, when the pump 20 is provided inside the fuel tank 18 which has a small depth, the intake pipe 23 can be omitted. That is, it is possible to directly mount the filter 22 on an intake opening of the motor 24 to lower the entire height of the pump 20. FIG. 6 is a cross-sectional view showing an example of the pump 20 from which the intake pipe 23 is omitted, wherein symbols which are equal to those in FIG. 3 indicate identical portions.

Here, the pressure regulating valve 32 is not always limited to the constitution in which the pressure regulating valve 32 is disposed inside the fuel pump 20, that is, inside the cylindrical housing 25 and the cap 26. For example, it may be possible that a pressure regulating valve is provided to the fuel hose 21 which connects the fuel pump 20 and the fuel injection valve 49 and a return pipe from the pressure regulating valve is additionally connected to the fuel pump 20.

Figure 7:
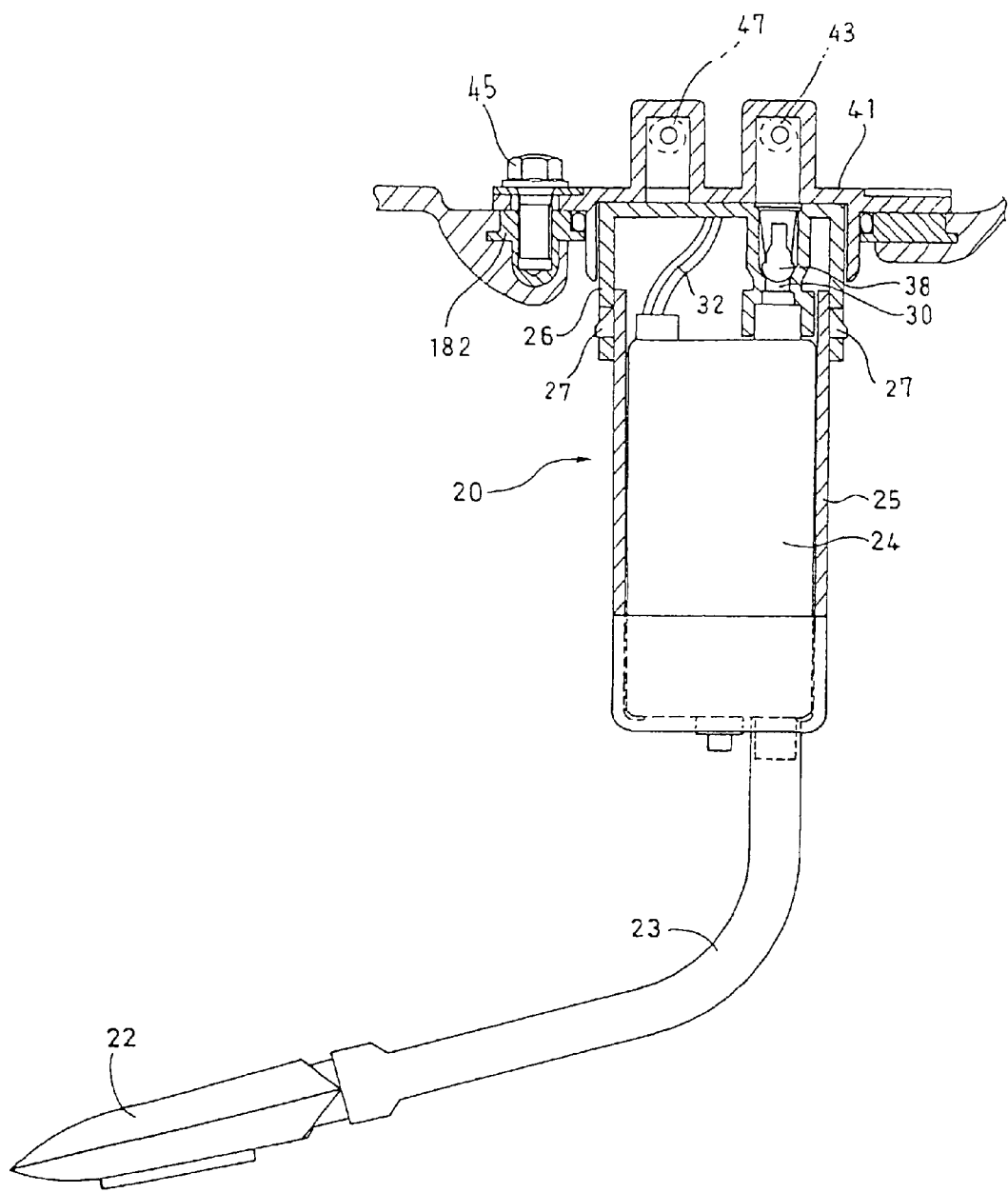
FIG. 7 is a cross-sectional view of a fuel pump according to another modification.
Figure 8:
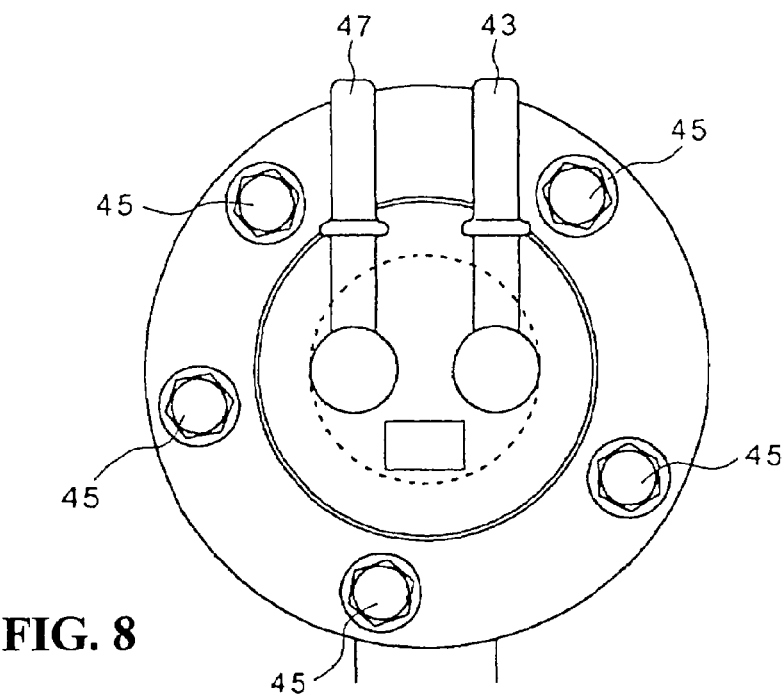
FIG. 8 is a top plan view of the fuel pump shown in FIG. 7.

FIG. 7 is a cross-sectional view of the fuel pump 20 showing a case in which the pressure regulating valve is not provided inside the fuel pump 20. FIG. 8 is a top plan view of the fuel pump 20, wherein symbols which are equal to those in FIG. 3 indicate identical or similar parts. In these drawings, the return pipe from the pressure regulating valve, not shown in the drawing, is connected to a return hose joint 47. According to this example, the discharge passage 30 can be shortened by an amount corresponding to the elimination of the pressure regulating valve from the fuel pump 20. Thus, a total length of the fuel pump 20 can be shortened.

Figure 9:
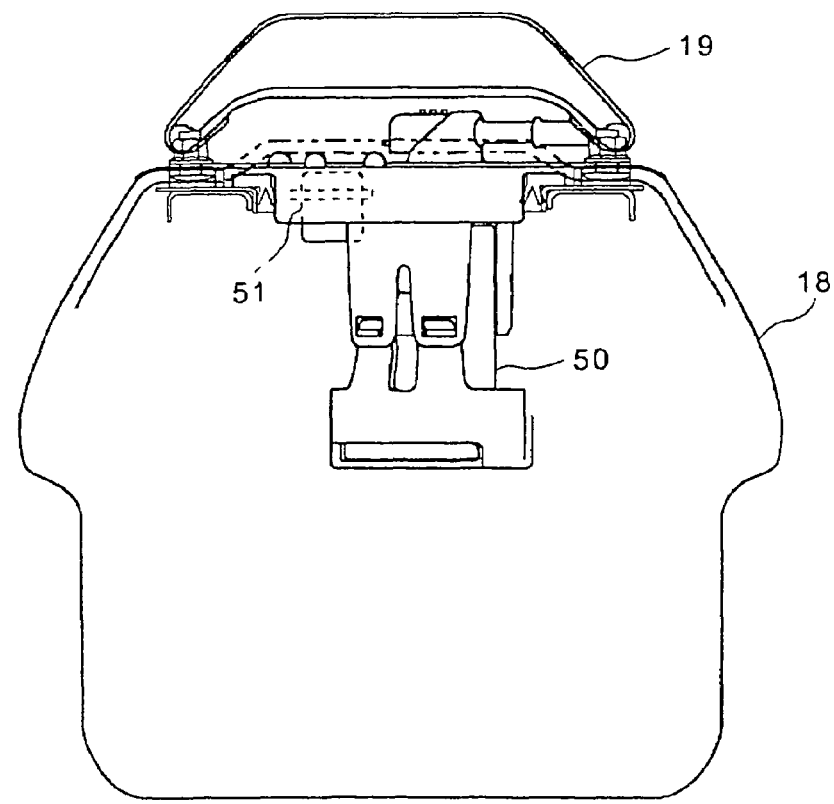
FIG. 9 is a transverse cross-sectional view of a fuel tank showing a state in which a fuel pump having a wide width is assumed to be mounted on a fuel tank.

For comparison purposes, assume a state in which a conventional type of fuel pump is mounted on the upper surface of the fuel tank 18. In FIG. 9, with respect to a fuel pump 50 which is mounted on the upper surface of the fuel tank 18 is different from the above-mentioned fuel pump 20. A pressure regulating valve 51 is provided at a position offset from a position right above the motor 24. Accordingly, the mounting area with respect to the fuel tank 18 is increased. Thus, the fuel tank 18 having a small width cannot ensure a sufficient mounting width on the upper surface of the fuel tank 18 whereby the upper portion of fuel pump 50 having a large width cannot be covered by the rider's seat 19 of an offroad model. In this manner, it is not proper to mount the conventional fuel pump on the fuel tank of the motorcycle of an offroad model which has a small width and in which the rider may move the seating position on the seat.

In the above-mentioned embodiment, the bottom plate 191 of the seat 19 performs an action of a cover member which covers the fuel pump, so that, in a motorcycle of an offroad model or for racing or the like, the fuel supply device can more properly cope with the manner of riding that the rider moves the sitting position on the seat. Here, although the bottom plate 191 is formed integrally with the seat 19 as the cover member, the cover member may not be formed integrally with the seat 19 and may be formed of a sheet-like member which is arranged between the upper portion of the fuel pump 20 and the bottom plate 191 or a cover may be arranged as a separate member in addition to the bottom plate 191. Due to the provision of the cover member which constitutes the bottom plate 191 or the like, the function of protecting the fuel pump 20 and piping and wiring on the base plate 41 can be further enhanced.

Figure 10:
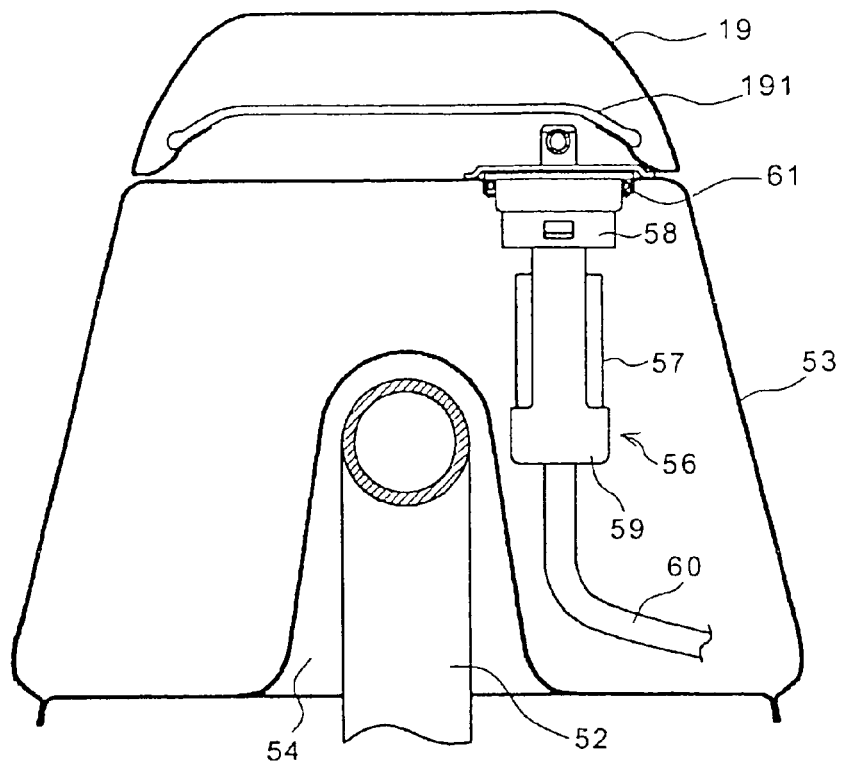
FIG. 10 is a cross-sectional view of a fuel tank according to a modification.

FIG. 10 is a transverse cross-sectional view of an essential part of the vehicle showing the modification of the fuel tank. In this embodiment, the fuel tank is suitable for a vehicle of a type which includes a main frame 52 extending in the fore-and-aft direction of the vehicle and has a portion close to a rear portion thereof directed downwardly. To allow the main frame 52 to traverse a fuel tank 53 longitudinally, that is, to arrange the fuel tank 53 such that the fuel tank 53 strides over the main frame 52, a retracting portion 54 that is indented towards the inner surface of the fuel tank 53 is formed at the bottom portion of the fuel tank 53. A fuel pump 56 is provided in a state wherein the fuel pump 56 is suspended inside the fuel tank 53 from the upper portion of the fuel tank 53. The fuel pump 56 constitutes a motor (pump body) 57, a cap 58 which incorporates a valve mechanism similar to the above-mentioned pressure regulating valve 32 and check valve 38 therein, and a housing 59 which is engaged with the cap 58 to hold the motor 57. An intake pipe 60 is connected to the pump body 57 and reaches the bottom portion of the fuel tank 53. The intake pipe 60 is, in the same manner as the constitution shown in FIG. 1, positioned so that a filter which is formed on the distal end of the intake pipe 60 is positioned at a position of the fuel tank 53 as low as possible. The upper portion of the cap 58 and the upper opening of the fuel tank 53 are engaged with each other in a fitting engagement by way of a sealing member 61.

On the upper portion of the fuel tank 53, in the same manner as the previous embodiment, the rider's seat 19 is arranged such that a front portion thereof covers the fuel tank 53 and the upper portion of the fuel pump 56 is protected by a bottom plate 191.

As in the case of this embodiment, the fuel pump 56 has an elongated shape as a whole. Thus, it is possible to arrange the fuel pump 56 so that the fuel pump 56 is offset to the left side (right side in the drawing) with respect to the fuel tank 53 to avoid the main frame 52.

Figure 11:
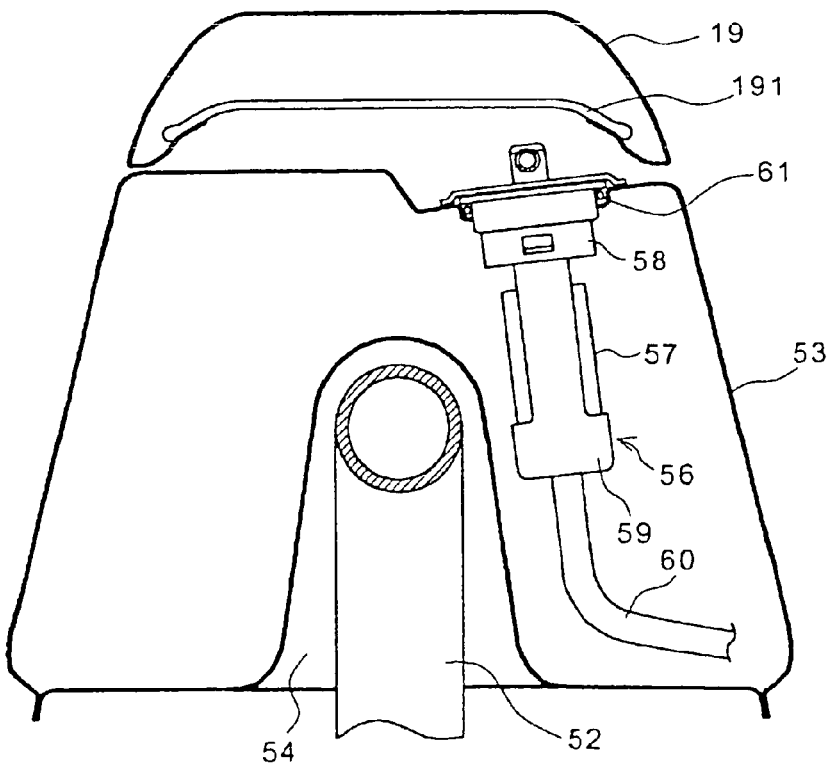
FIG. 11 is a cross-sectional view of a fuel tank according to a further modification.

Here, the fuel tank 53 is arranged to allow the fuel tank 53 to easily stride over the main frames 52. The fuel tank 53 is configured such that a lower portion thereof is widened in the lateral direction and the upper portion thereof is narrowed corresponding to the width of the seat 19 to allow the rider to easily stride over the fuel tank 53. Accordingly, as shown in FIG. 11, the fuel pump 56 may be arranged in an inclined manner in conformity with such a flaring shape of the fuel tank 53.

Although the present invention is most suitable for an offroad vehicle having a fuel tank of a relatively small width, the present invention may be applied to a large-sized fuel tank to cover the upper portion of the fuel pump with the front portion of the seat.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel supply device including a fuel pump which is disposed inside a fuel tank located in front of a rider's seat positioned on a vehicle, comprising:
    a base plate connected to an upper surface of the fuel tank;
    a fuel discharge joint formed on the base plate;
    a power supply connector formed on the base plate;
    a pump body formed on a lower surface of the base plate; and
    a fuel intake portion located below the pump body and being directed to a bottom portion of the fuel tank;
    wherein the base plate is located at a position that is covered by a front portion of a the rider's seat of the vehicle, and
    wherein a main body of the fuel pump that houses the pump body is mounted via the base plate to the upper surface of the fuel tank such that the main body of the fuel pump is connected to the upper surface of the fuel tank via the base plate, and
    wherein the fuel pump extends toward the bottom portion of the fuel tank, and
    wherein the pump body is formed in a cylindrical shape and is provided with a check valve and a pressure regulating valve, said check valve and said pressure regulating valve being arranged above the pump body and on an extension of a cross-sectional plane of the pump body between the pump body and the base plate such that the check valve and the pressure regulating valve do not project from an outer diameter of the pump body.

2. The fuel supply device according to claim 1, wherein the vehicle is an offload vehicle.

3. The fuel supply device according to claim 1, wherein a cover member covers the fuel pump, said cover member being provided between the seat and the fuel pump.

4. The fuel supply device according to claim 2, wherein a cover member covers the fuel pump, said cover member being provided between the seat and the fuel pump.

5. The fuel supply device according to claim 1, wherein the fuel tank is arranged to be mounted astride a frame member extending in the fore-and-aft direction of the vehicle, a lower surface of said fuel tank being formed into a recessed shape directed to the inside of the fuel tank.

6. The fuel supply device according to claim 1, wherein a distance between the main body of the fuel pump and a lower surface of the fuel tank is greater than a distance between the main body of the fuel pump and the upper surface of the fuel tank.

7. A fuel pump adapted to be disposed inside a fuel tank located in front of a rider's seat positioned on a vehicle, comprising:
    a base plate adapted to be connected to an upper surface of the fuel tank;
    a fuel discharge joint connected to the base plate;
    a power supply connector connected to the base plate;
    a pump body connected to a lower surface of the base plate; and
    a fuel intake portion located below the pump body and being directed to a bottom portion of the fuel tank;
    wherein the base plate is located at a position that is adapted to be covered by a front portion of the rider's seat of the vehicle, and
    wherein a main body of the fuel pump that houses the pump body is mounted via the base plate to the upper surface of the fuel tank such that the main body is connected to the upper surface of the fuel tank via the base plate,
    wherein the fuel pump extends toward the bottom portion of the fuel tank, and
    wherein the pump body is formed in a cylindrical shape and is provided with a check valve and a pressure regulating valve, said check valve and said pressure regulating valve being arranged above the pump body and on an extension of a cross-sectional plane of the pump body between the pump body and the base plate such that the check valve and the pressure regulating valve do not project from an outer diameter of the pump body.

8. The fuel pump adapted to be disposed inside a fuel tank according to claim 7, wherein the vehicle is an offroad vehicle.

9. The fuel pump adapted to be disposed inside a fuel tank according to claim 7, wherein a cover member covers the fuel pump, said cover member being provided between the seat and the fuel pump.

10. The fuel pump adapted to be disposed inside a fuel tank according to claim 8, wherein a cover member covers the fuel pump, said cover member being provided between the seat and the fuel pump.

11. The fuel pump adapted to be disposed inside a fuel tank according to claim 7, wherein the fuel tank is arranged to be mourned astride a frame member extending in the fore-and-aft direction of the vehicle, a lower surface of said fuel tank being formed into a recessed shape directed to the inside of the fuel tank.

12. The fuel pump adapted to be disposed inside a fuel tank according to claim 7, wherein a distance between the fuel pump and a lower surface of the fuel tank is greater than a distance between the fuel pump and die upper surface of the fuel tank.

* * * * *